United States Patent
Yoshida (10) Patent No.: US 6,485,141 B2
(45) Date of Patent: *Nov. 26, 2002

(54) LENS-INSTALLING APPARATUS FOR RIMLESS EYEGLASSES

(75) Inventor: Takehiko Yoshida, Higashiosaka (JP)

(73) Assignee: Vision Optic Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/924,560

(22) Filed: Aug. 8, 2001

(65) Prior Publication Data

US 2002/0030787 A1 Mar. 14, 2002

(30) Foreign Application Priority Data

Sep. 7, 2000 (JP) .......................................... 2000-6517
Nov. 7, 2000 (JP) ........................................ 2000-339069

(51) Int. Cl.[7] ................................................. G02C 1/02
(52) U.S. Cl. ........................ 351/110; 351/141; 351/146; 411/108
(58) Field of Search .................................. 351/110, 141, 351/140, 142, 143–146; 411/302, 324, 335, 427, 432, 437, 103, 108

(56) References Cited

U.S. PATENT DOCUMENTS 5,627,610 A * 5/1997 Marui et al. ................. 351/141
6,170,950 B1 * 1/2001 Yoshida ....................... 351/110

* cited by examiner

*Primary Examiner*—Huy Mai
(74) *Attorney, Agent, or Firm*—Keating & Bennett, LLP (57) ABSTRACT

A rimless eyeglasses lens-installing apparatus, a connector connects a lens to a lug and a fastening tool fixed the lens and the connector to each other. The fastening tool has a first fastening member and a second fastening member. A metal insertion member having a threaded hole formed thereon is disposed in an internal portion of the first fastening member by insert molding. An outer threaded portion of the first fastening member engages a threaded portion of a lens through-hole. The threaded portion of the second fastening member is screwed into the threaded hole of the insertion member. A portion of the first fastening member projecting from a rear surface of the lens is cut off appropriately.

11 Claims, 8 Drawing Sheets

LENS-INSTALLING APPARATUS FOR RIMLESS EYEGLASSES

BACKGROUND OF THE INVENTION

1. Field of the Invention

The present invention relates to a lens-installing apparatus for rimless eyeglasses.

2. Background of the Invention

Figure 8:
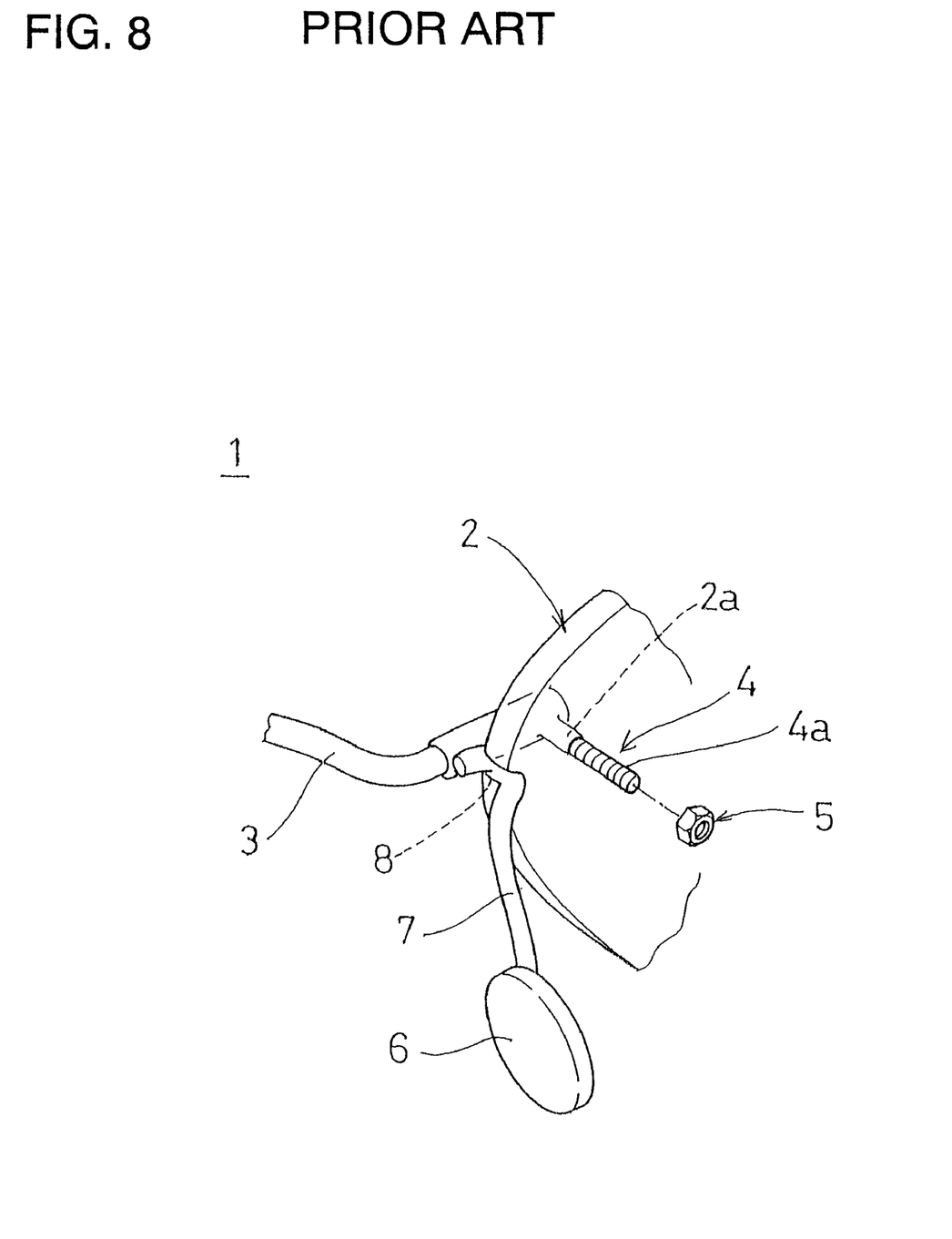
FIG. 8 is a perspective view showing main elements of a conventional rimless eyeglasses lens-installing apparatus constituting the background of the present invention.

FIG. 8 is a perspective view showing a conventional rimless eyeglasses lens-installing apparatus 1, which includes a lens 2 having a circular through-hole 2a formed therein. A male screw 4 mounted on one end of a bridge 3 is inserted through the lens 2 from the front side of the lens 2. A nut 5 is engaged on a male threaded portion 4a of the male screw 4 from the rear side of the lens 2. One end of a pad arm 7 supporting a pad 6 is locked to a cut-out portion 8 provided at a portion of the peripheral surface of the lens 2.

Although not shown in FIG. 8, the other lens is installed at the other end of the bridge 3 by using an eyeglasses lens-installing apparatus that is similar to the rimless eyeglasses lens-installing apparatus 1. Although not shown in FIG. 8, the lens and the lug of the frame are installed on each other by an eyeglasses lens-installing apparatus that is similar to the rimless eyeglasses lens-installing apparatus 1.

However, in the conventional eyeglasses lens-installing apparatus 1, angular projected portions including the nut 5 and the cornered male screw 4 are present on the rear surface of the lens 2. Thus, a user's safety may be jeopardized when the user wears the rimless eyeglasses having the rimless eyeglasses lens-installing apparatus 1 installed thereon. Further, when the lens 2 is wiped with a cleaning cloth or tissue or other cleaning element, there is a possibility that the cloth, tissue or cleaning element is torn by the angular projected portions such as the front end of the male screw 4 and the cornered portions of the nut 5.

In addition, in the rimless eyeglasses lens-installing apparatus 1, the through-hole 2a of the lens 2 is circular and the male screw member 4 is columnar. Thus, there is a fear that the root portion (neck) of the male screw 4 rotates together with the nut member 5 in the through-hole 2a of the lens 2. That is, the lens 2 may be loosened at the portion where the lens 2 is connected to the lug of the frame as well as the bridge 3. That is, the conventional rimless eyeglasses-installing apparatus 1 is incapable of reliably fixing the lens 2 thereto.

SUMMARY OF THE INVENTION

In order to overcome the problems described above, preferred embodiments of the present invention provide a rimless eyeglasses-installing apparatus that is capable of reliably fixing a lens thereto and is safe and allows the surface of the lens to be polished easily without any problems.

In accordance with a preferred embodiment of the present invention, a rimless eyeglasses lens-installing apparatus includes a lens, a lens through-hole disposed in the vicinity of an edge of the lens and penetrating the lens in a direction from a side of one main surface thereof to a side of the other main surface thereof, a connector disposed on the side of the one main surface of the lens to connect the lens to a lug and/or a bridge, a connector through-hole communicating with the lens through-hole and penetrating the connector, and a fastening tool inserted into the lens through-hole in a direction from the side of the one main surface of the lens and/or the side of the other main surface thereof to install the lens and the connector on each other. In this apparatus, the fastening tool is installed in the lens through-hole in such a way that an end of the fastening tool does not project partly from the other main surface of the lens.

The fastening tool preferably includes a first fastening member that is inserted into the lens through-hole in a direction from the side of the other main surface of the lens and fastened to the lens through-hole, and a second fastening member having a threaded portion on a peripheral surface thereof and inserted into the first fastening member in a direction from the side of the one main surface of the lens to fasten the second fastening member to the first fastening member through the connector through-hole. In this apparatus, the first fastening member may have an inner threaded portion engaging the threaded portion of the second fastening member.

The lens through-hole has a threaded portion on an inner peripheral surface thereof. The fastening tool includes a first fastening member inserted into the lens through-hole in a direction from a side of one main surface of the lens or from a side of the other main surface thereof and fastened to the lens through-hole, and a second fastening member having a threaded portion on a peripheral surface thereof and inserted into the first fastening member in a direction from the side of the one main surface of the lens and fastened to the first fastening member through the connector through-hole. In this apparatus, the first fastening member may have an outer threaded portion engaging the threaded portion of the lens through-hole and an inner threaded portion engaging the threaded portion of the second fastening member.

The lens through-hole has a threaded portion disposed on an inner peripheral surface thereof. The fastening tool includes a first fastening member inserted into the lens through-hole in a direction from a side of one main surface of the lens or from a side of the other main surface thereof and fastened to the lens through-hole, and a second fastening member having a threaded portion on a peripheral surface thereof and inserted into the first fastening member in a direction from the side of the one main surface of the lens to fasten the second fastening member to the first fastening member through the connector through-hole. The first fastening member may have an outer threaded portion engaging the threaded portion of the lens through-hole and an insertion member having a threaded hole into which the threaded portion of the second fastening member is screwed. The second fastening member and the insertion member may each be made of a metal material.

According to another preferred embodiment of the present invention, a rimless eyeglasses lens-installing apparatus includes a lens, a lens through-hole disposed in the vicinity of an edge of the lens and penetrating the lens in a direction from a side of one main surface of the lens to a side of the other main surface thereof and having a threaded portion on an inner peripheral surface thereof, a connector disposed on the side of the one main surface of the lens to connect the lens to a lug or a bridge, and a fastening tool that is inserted into the lens through-hole in a direction from the side of the one main surface of the lens and/or the other main surface thereof to install the lens and the connector on each other. The fastening tool includes a first fastening member fastened to the lens through-hole, and a second fastening member that is integral with the connector and having a threaded portion on a peripheral surface thereof and inserted into the first fastening member in a direction from the side of the one main surface of the lens to fasten the second fastening member to the first fastening member. In this apparatus, the first fastening member has an outer threaded portion engaging the threaded portion of the lens through-hole, and an insertion member having a threaded hole into which the threaded portion of the second fastening member is screwed. The second fastening member and the insertion member are each preferably made of a metal material. The first fastening member is installed in the lens through-hole in such a way that an end of the first fastening member projects partially neither from the one main surface of the lens nor from the other main surface thereof.

The insertion member preferably has a rotation/slip-off prevention portion including a slit, a concave portion, a narrow concave portion or other such portion disposed on a peripheral surface thereof to allow the insertion member to be inserted firmly into the first fastening member.

Preferably, the first fastening member is installed in the lens through-hole in such a way that an end of the first fastening member does not project partly from the other main surface of the lens.

In the rimless eyeglasses lens-installing apparatus of preferred embodiments of the present invention, the fastening tool fixing the lens and the connector to each other is installed in the lens through-hole in such a way that the end of the fastening tool does not project partially from the other main surface of the lens. Therefore, it is possible to make the other main surface of the lens and the other main surface side of the fastening tool substantially flush with each other.

According to preferred embodiments of the present invention, it is possible to provide a rimless eyeglasses-installing apparatus that is capable of reliably fixing a lens thereto and is safe and allows the surface of the lens to be polished easily without any problems.

The above and further advantages, features, elements and characteristics of the present invention will be more fully apparent from the following detailed description of preferred embodiments with reference to the accompanying drawings.

DETAILED DESCRIPTION OF PREFERRED EMBODIMENTS

Figure 1:
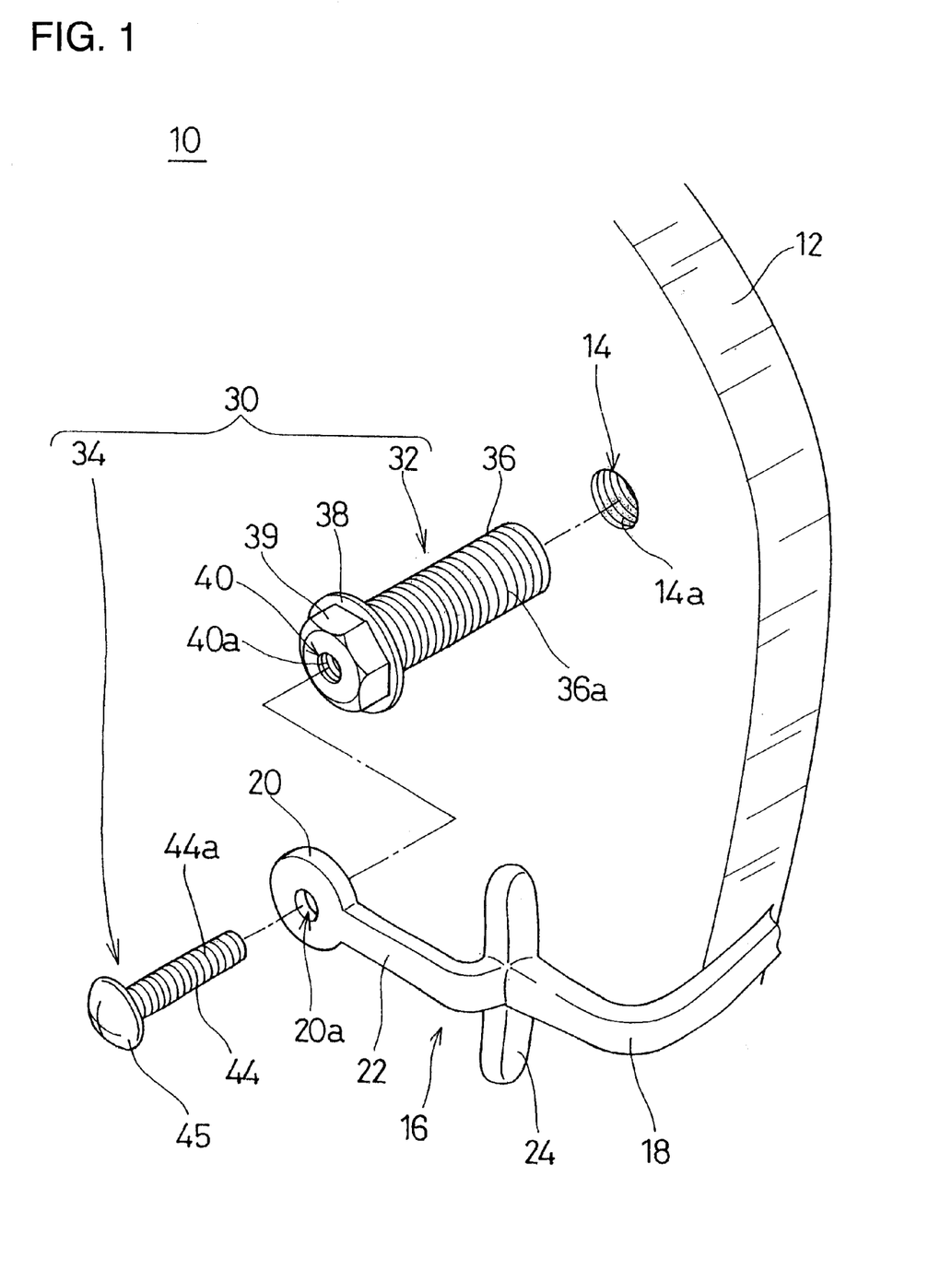
FIG. 1 is an exploded perspective view showing a preferred embodiment of the rimless eyeglasses lens-installing apparatus of the present invention.
Figure 2:
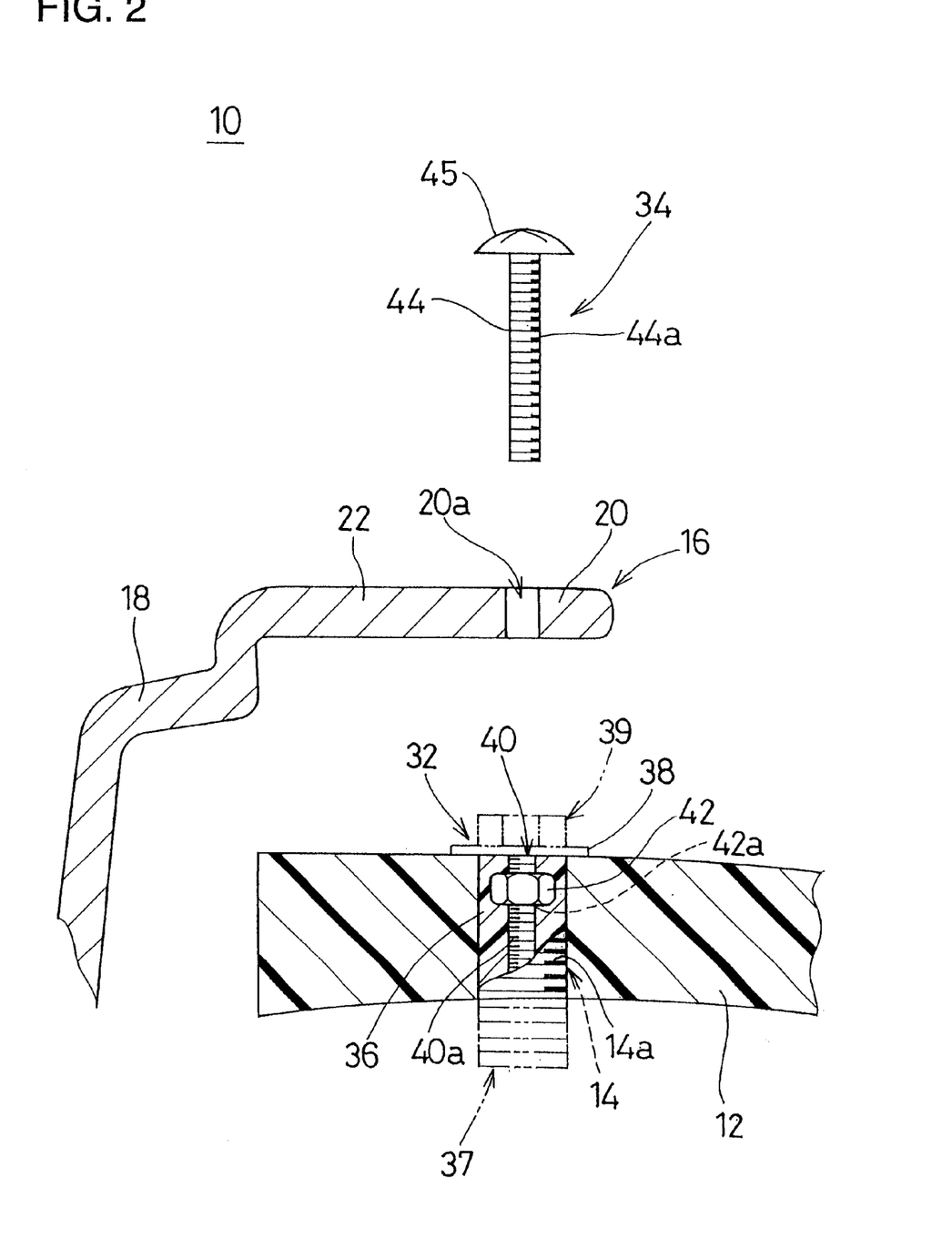
FIG. 2 is an exploded diagrammatic view partially in section showing the eyeglasses lens-installing apparatus shown in FIG. 1.
Figure 3:
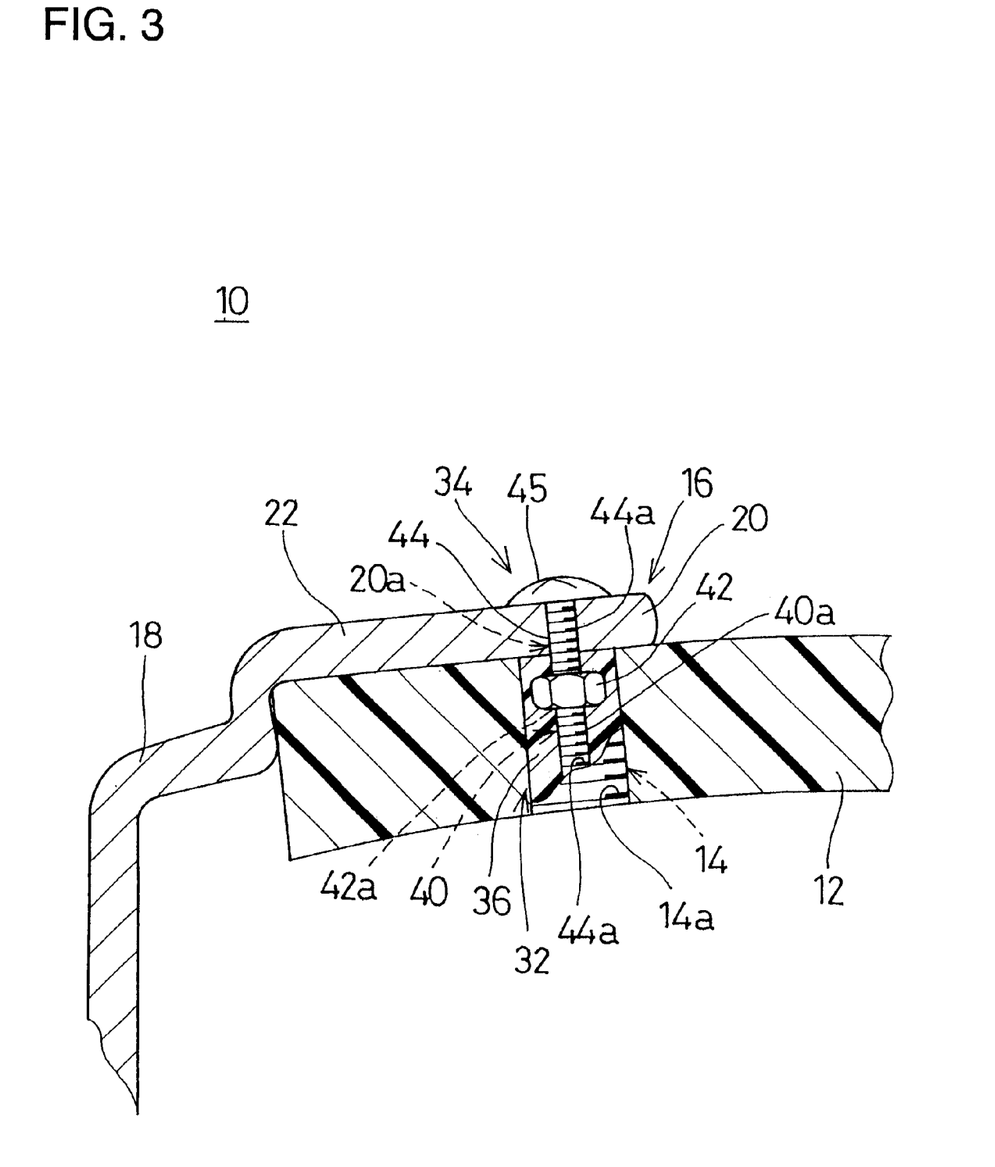
FIG. 3 is a diagrammatic view partially in cross section showing the main elements of the eyeglasses lens-installing apparatus of the preferred embodiment shown in FIGS. 1 and 2.

FIG. 1 is an exploded perspective view showing main elements of a preferred embodiment of a rimless eyeglasses lens-installing apparatus of the present invention. FIG. 2 is an exploded diagrammatic view partly in section showing the eyeglasses lens-installing apparatus shown in FIG. 1. FIG. 3 is a diagrammatic view partly in cross section showing the main elements of the eyeglasses lens-installing apparatus of the preferred embodiment shown in FIGS. 1 and 2.

A rimless eyeglasses lens-installing apparatus 10 of the preferred embodiment includes a lens 12 have a desired lens shape. The lens 12 is preferably made of a plastic material. A lens through-hole 14 that is preferably substantially circular penetrates through the lens 12. The lens through-hole 14 is disposed in the vicinity of the edge of the lens 12. A threaded portion 14a such as a female screw is provided on the inner peripheral surface of the lens through-hole 14.

A connector 16 that is preferably made of a plastic material is disposed on the front surface of the lens 12. The connector 16 is used to connect the lens 12 to a lug 18. The connector 16 includes a base 20 that is preferably substantially disk-shaped. The base 20 has a base through-hole 20a penetrating therethrough. That is, the base through-hole 20a is the through-hole of the connector 16. The base 20 is supported by a support member 22 preferably having a substantially J-shaped shape and being disposed at a position where the base through-hole 20a and the lens through-hole 14 align with each other. In this case, the base 20 is disposed at one end of the supporting portion 22 along its longitudinal direction, whereas a contact portion 24 which contacts the edge of the lens 12 is disposed at the other of the supporting portion 22 along its longitudinal direction. The base 20, the supporting portion 22, the contact portion 24, and the lug 18 are preferably integrally formed of a metal material.

The lens 12 and the connector 16 are fixed to each other with a fastening tool 30. As shown in FIG. 3, the fastening tool 30 has a first fastening member 32 fastened to the lens through-hole 14 and a second fastening member 34 fastened to the first fastening member 32 through the base through-hole 20a.

The first fastening member 32 preferably includes a substantially cylindrical shaft portion 36. As an outer threaded portion of the shaft portion 36, a threaded portion 36a including a male screw is disposed on the peripheral surface thereof. A disk-shaped flange portion 38 is preferably integral with the shaft portion 36 at one end of the shaft portion 36 in its axial direction. The outer diameter of the flange portion 38 is preferably larger than that of the shaft portion 36. A head portion 39 that preferably has a substantially hexagonal configuration is integral with the shaft portion 36 and the flange portion 38.

The first fastening member 32 has a through-hole 40 penetrating therethrough from its one end to its other end in its axial direction. The through-hole 40 also penetrates through the shaft portion 36, the flange portion 38, and the head portion 39. As an inner threaded portion of the through-hole 40, a threaded portion 40a including a female screw is formed on the inner peripheral surface thereof. In this preferred embodiment, a washer-based bolt preferably made of a plastic material such as polycarbonate flexible or elastic is included to define the first fastening member 32.

An insertion member 42 that defines a fixing member is disposed inside the first fastening member 32. That is, the insertion member 42 including a metal hexagon nut is disposed on the inner peripheral surface of the shaft portion 36 of the first fastening member 32 in such a way that the insertion member 42 is disposed at the side of one end of the shaft portion 36 along its axial direction. In the present preferred embodiment, the insertion member 42 is disposed at the side of the flange portion 38. As the insertion member 42, a metal hexagon nut is preferably provided to be integral with an internal portion of the shaft portion 36 by insert molding. The inner diameter of a threaded hole 42a of the insertion member 42 is preferably substantially equal to or slightly larger than the diameter of a shaft portion 44 of the second fastening member 34 which will be described later.

The second fastening member 34 preferably includes the columnar shaft portion 44. A threaded portion 44a including a male screw is preferably provided on the peripheral surface of the shaft portion 44. A slotted head portion 45 is disposed at one end of the shaft portion 44 along its longitudinal direction. The shaft portion 44 and the head portion 45 are integrally formed of a metal material. In the present preferred embodiment, as the second fastening member 34, a slotted screw made of metal is preferably used.

In this case, the diameter of the shaft portion 44 of the second fastening member 34 is preferably substantially equal to or slightly smaller than the inner diameter of the threaded hole of the shaft portion 36 of the first fastening member 32. The diameter of the shaft portion 36 of the first fastening member 32 is preferably substantially equal to or slightly smaller than the diameter of the threaded hole of the lens through-hole 14. The length of the shaft portion 44 of the second fastening member 34 in its axial direction is preferably substantially equal to the sum of the thickness of the connector 16 and the thickness of the lens 12. The length of the shaft portion 36 of the first fastening member 32 along its axial direction is preferably larger than the thickness of the lens 12. The length of the inner threaded portion 40a of the shaft portion 36 is preferably substantially equal to the axial length of the shaft portion 36.

The inner threaded portion 40a of the first fastening member 32 is not necessarily formed over the whole length of the shaft portion 36 along its axial direction but may be formed partly in the middle part of the shaft portion 36 along its axial direction.

The inner threaded portion 40a of the first fastening member 32 is not necessarily provided. Instead, the internal portion of the shaft portion 36 may be provided with an unthreaded hole into which the shaft portion 44 of the second fastening member 34 is inserted. In this case, the threaded portion 44a of the shaft portion 44 of the second fastening member 34 is screwed into the threaded hole 42a of the insertion member 42 of the first fastening member 32. In this manner, the second fastening member 34 and the first fastening member 32 are connected to each other.

In the rimless eyeglasses lens-installing apparatus 10 of the present preferred embodiment, initially, the first fastening member 32 is inserted into the lens through-hole 14 from the front side of the lens 12. At this time, the threaded portion 36a (outer threaded portion) of the first fastening member 32 engages the threaded portion 14a of the lens through-hole 14. In the present preferred embodiment, as shown with two-dot chain lines of FIG. 2, the head portion 39 of the first fastening member 32 and the flange portion 38 thereof project from the front surface of the lens 12, whereas a projected portion 37 of the shaft portion 36 of the first fastening member 32 projects from the rear surface of the lens 12. These projected portions are appropriately cut off with a cutting apparatus such as a nipper. It is possible to prepare a plurality of the shaft portions 36 having different axial lengths so that they are used selectively, according to the thickness of the lens 12.

Next, the connector 16 is disposed on the front surface of the lens 12 in such a way that the base through-hole 20a of the connector 16 and the through-hole 40 of the first fastening member 32 align with each other. The shaft portion 44 of the second fastening member 34 is inserted into the base through-hole 20a of the connector 16 and the through-hole 40 of the first fastening member 32 from the front side of the lens 12.

The threaded portion 36a (outer threaded portion) of the first fastening member 32 that is preferably made of the plastic material engages the threaded portion 14a of the lens 12 that is preferably made of the plastic material. Thus, at this time, owing to the elasticity of the plastic materials, the threaded portion 36a and the threaded portion 14a are tightened into each other, with the threaded portions 36a and 14a in close contact with each other. Therefore, it is possible to prevent the lens 12 and the first fastening member 32 from loosening from each other.

The threaded portion 44a of the second fastening member 34 engages the inner threaded portion 40a of the first fastening member 32 and the threaded hole 42a of the insertion member 42. In this case, in particular, the shaft portion 44 of the metal second fastening member 34 and the metal insertion member 42 are connected to each other firmly by the engagement of the threaded portions. Therefore, the lens 12 and the connector 16 are connected to each other reliably.

Accordingly, in the present preferred embodiment, it is possible to prevent the connector 16 and the lens 12 from rotating together. Therefore, it is possible to prevent the lens 12 from loosening and fix the lens 12 and the connector 16 to each other securely and firmly.

Further, in the preferred embodiment, there is no projected portion on the rear side of the lens 12. Therefore, a user is safe when the user wears the rimless eyeglasses having the rimless eyeglasses lens-installing apparatus 10 installed thereon. Further, when the user cleans the lens 12 with a cleaning cloth or other cleaning element, the user does not have such a trouble as the user has in the rimless eyeglasses, shown in FIG. 8, having the conventional rimless eyeglasses lens-installing apparatus installed thereon.

Figure 4:
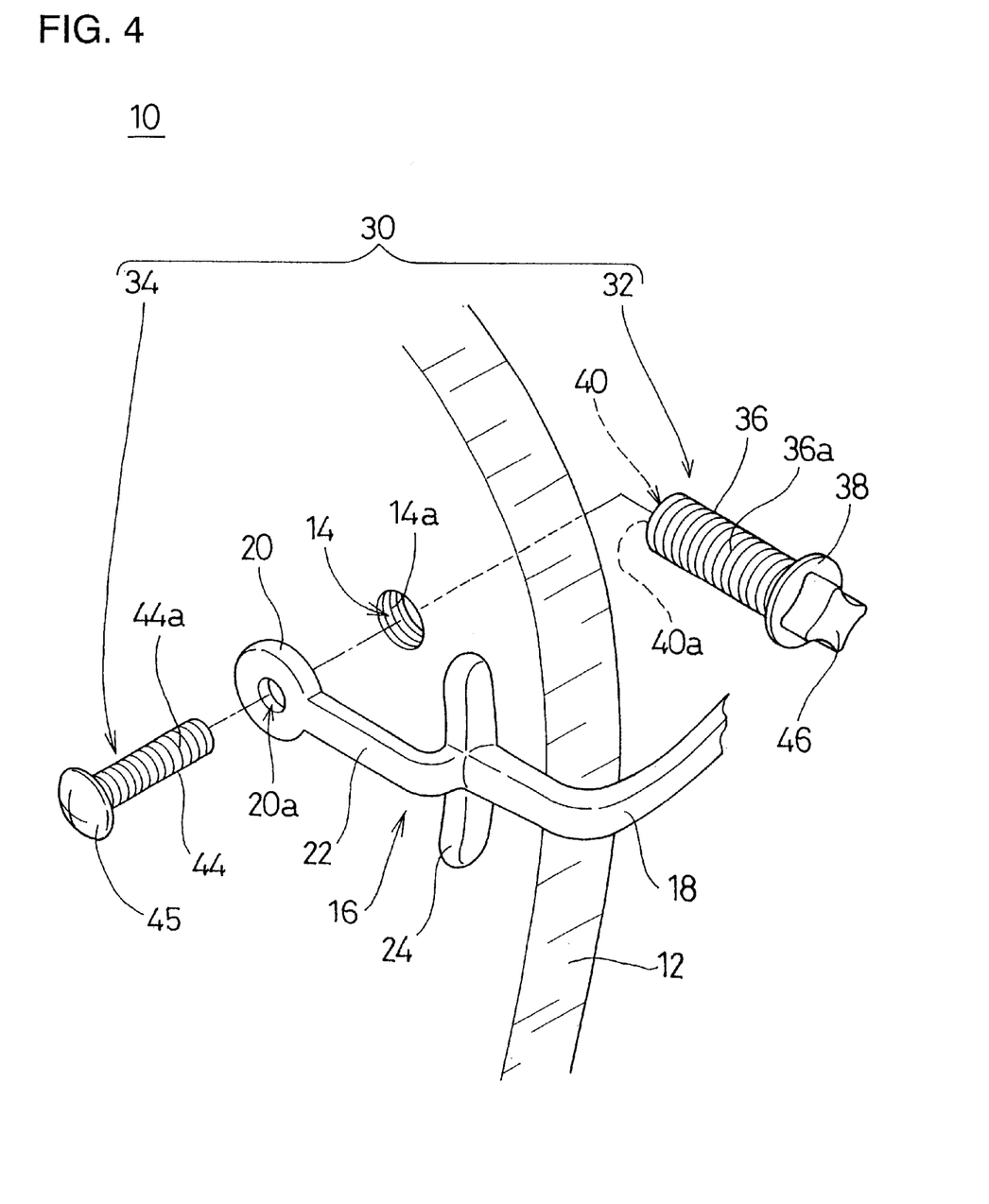
FIG. 4 is an exploded perspective view showing main elements of another preferred embodiment of the rimless eyeglasses lens-installing apparatus of the present invention.
Figure 5:
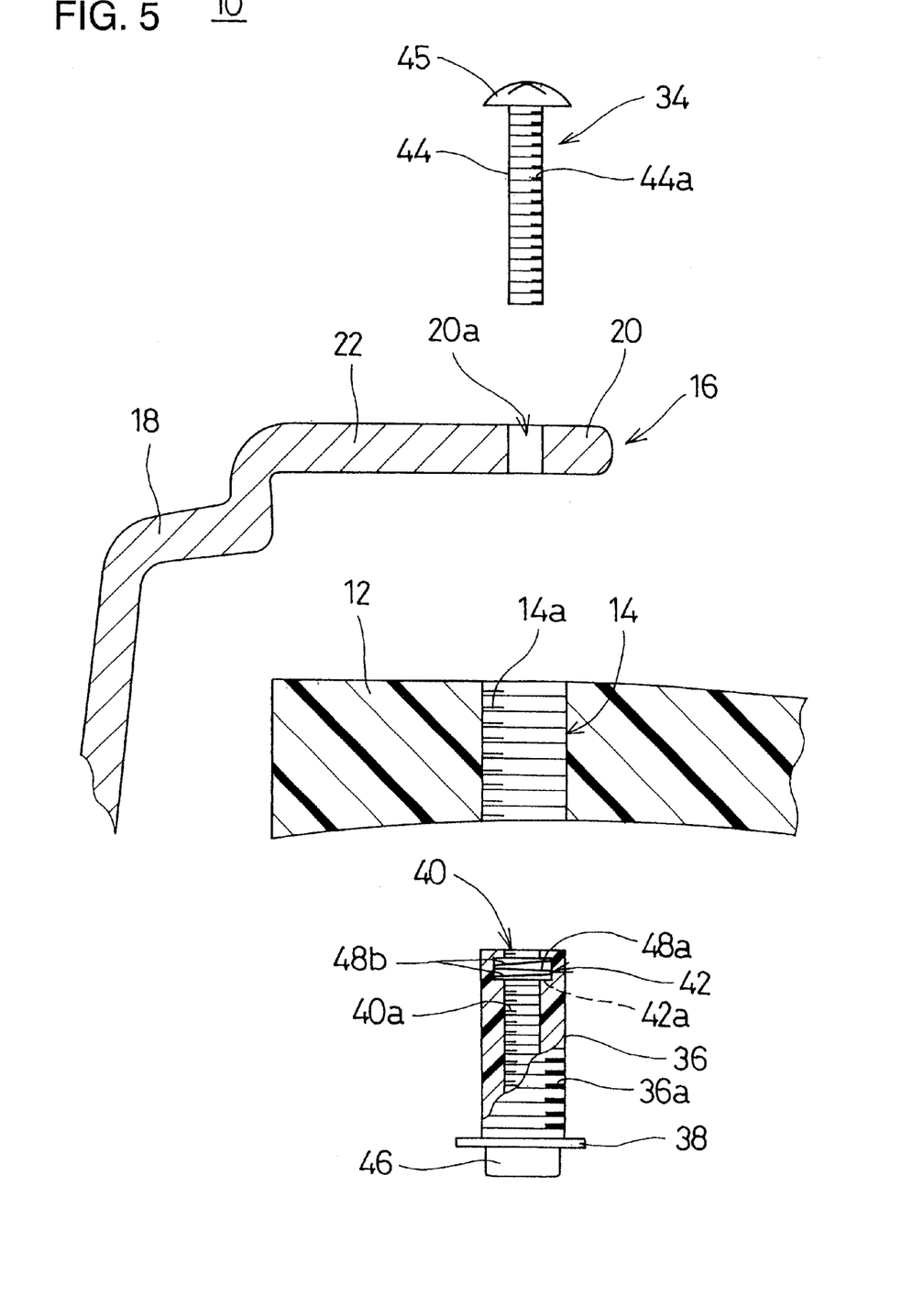
FIG. 5 is an exploded diagrammatic view partly in section showing the eyeglasses lens-installing apparatus shown in FIG. 4.
Figure 6:
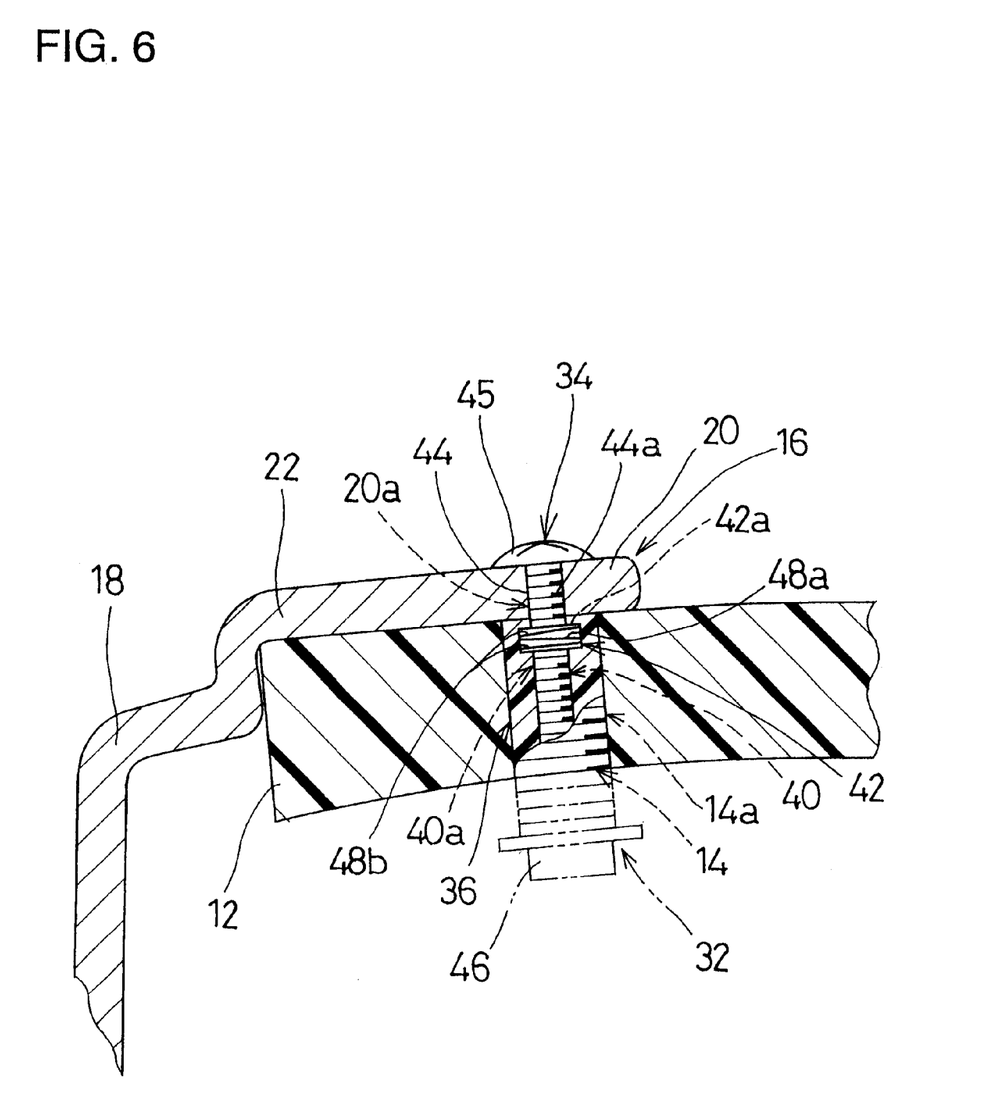
FIG. 6 is a diagrammatic view partly in cross section showing the main elements of the eyeglasses lens-installing apparatus of the embodiment shown in FIGS. 4 and 5.

In the preferred embodiment shown in FIGS. 1 through 3, the first fastening member 32 is inserted into the lens through-hole 14 from the front side of the lens 12, specifically, in the same direction as that in which the second fastening member 34 is inserted into the first fastening member 32. However, as shown in FIGS. 4 through 6, the first fastening member 32 may be inserted into the lens through-hole 14 in the direction opposite to that in which the second fastening member 34 is inserted into the first fastening member 32. That is, the first fastening member 32 may be inserted into the lens through-hole 14 from the rear side of the lens 12.

In the preferred embodiment shown in FIGS. 1 through 3, the head portion 39 of the first fastening member 32 preferably has a substantially hexagonal configuration. But the configuration of the head portion 39 is not so limited. For example, as shown in FIGS. 4 through 6, the head portion 39 may be substantially square or substantially triangular.

In the preferred embodiment shown in FIGS. 1 through 3, the substantially hexagonal nut is preferably used as the insertion member 42. But the insertion member 42 is not limited to that. For example, as shown in FIGS. 4 through 6, the insertion member 42 maybe substantially cylindrical or substantially elliptical. Instead, the insertion member 42 maybe substantially rectangular, substantially square, substantially triangular or substantially polygonal in section. In this case, it is necessary to form a threaded hole that engages the threaded portion 44a of the second fastening member 34 inside the insertion member 42.

In the preferred embodiment shown in FIGS. 4 through 6, the insertion member 42 has a rotation/slip-off prevention portion 48 (48a, 48b) disposed on the peripheral surface thereof to stably and firmly insert the insertion member 42 into the shaft portion 36 of the first fastening member 32, when the insertion member 42 is disposed on the inner peripheral surface of the shaft portion 36 of the first fastening member 32 by insert molding. The rotation/slip-off prevention portion 48 (48a, 48b) prevents the insertion member 42 from rotating inside the first fastening member 32 or slipping off therefrom, when the second fastening member 34 is inserted into the insertion member 42 to engage the second fastening member 34 with the insertion member 42.

The rotation/slip-off prevention portion 48 (48a, 48b) is disposed on the peripheral surface of the insertion member 42 by forming a slit, a groove, a narrow groove, a concave portion, a narrow concave portion, a convex portion or a narrow convex portion. The rotation/slip-off prevention portion 48 (48a, 48b) is preferably provided on the peripheral surface of the insertion member 42 circumferentially in such a way that a plurality of the rotation/slip-off prevention portions 48 (48a, 48b) are axially disposed thereon at certain intervals.

The rotation/slip-off prevention portion 48 (48a, 48b) shown in FIGS. 4, 5, and 6 preferably includes a slit. The rotation/slip-off prevention portion 48 has the portion 48a that is substantially orthogonal to the axial direction of the insertion member 42 and the portion 48b diagonal to the axial direction of the insertion member 42. Fundamentally, a plurality of the rotation/slip-off prevention portions 48 (48a, 48b) are disposed at certain intervals on the peripheral surface of the insertion member 42 but one rotation/slip-off prevention portion 48 may be disposed thereon, as described above. It is possible to appropriately alter conditions of the rotation/slip-off prevention portion 48 (48a, 48b) such as its arrangement, amount, size, and sectional configuration, according to the relativity to the first fastening member 32.

In addition to the screws used in each of the above-described preferred embodiments, the following screws not having an angular portion can be used as the fastening tool 30: a slotted round machine screw, a cross recessed round machine screw, a slotted round fillster head machine screw, a slotted pan head machine screw, a cross recessed pan head machine screw, a slotted raised countersunk head machine screw, and a cross recessed raised countersunk head machine screw.

Figure 7:
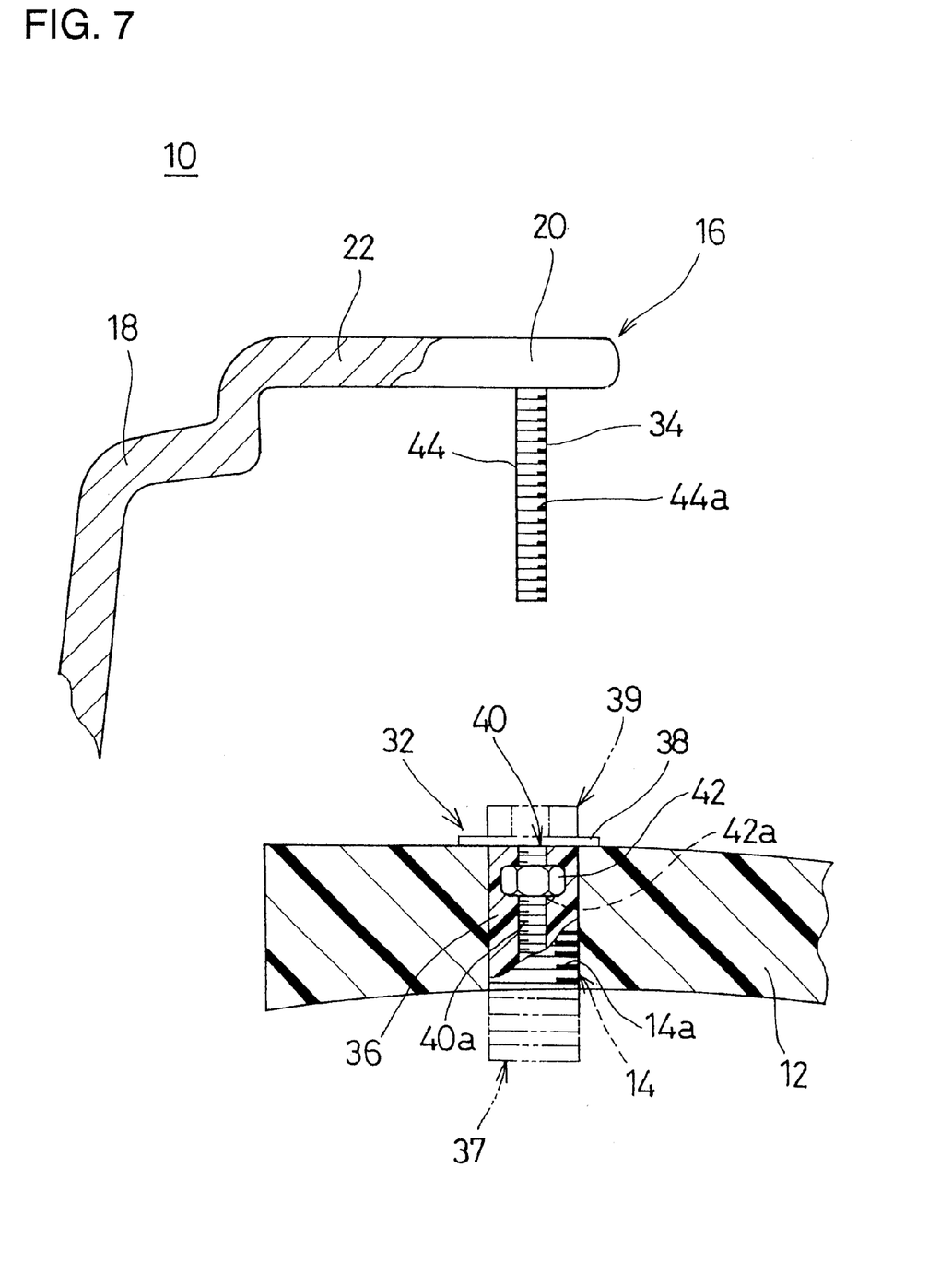
FIG. 7 is an exploded diagrammatic view partly in section showing a modification of the eyeglasses lens-installing apparatus of the present invention.

In each of the above-described preferred embodiments, as shown in FIG. 7, the second fastening member 34 and the connector 16 may be formed integrally. That is, in a modification shown in FIG. 7, the base 20 of the connector 16 is not provided with the base through-hole 20a, and the shaft portion 44 of the second fastening member 34 and the base 20 of the connector 16 are formed integrally. Therefore, the rimless eyeglasses lens-installing apparatus of the modification has a smaller number of components than each of the above-described preferred embodiments and yet is capable of firmly fixing the connector 16 and the lens 12 to each other, without rotating the connector 16 and the lens 12 together. Further, because in the modification, it does not occur that the head portion 45 of the second fastening member 34 projects from the front surface of the lens 12, specifically, the front surface of the connector 16, it is possible to make the front portion of the second fastening member 34 and the front surface of the connector 16 flush with each other. Thus, the rimless eyeglasses lens-installing apparatus is safe and convenient for cleaning the surface of the lens 12.

Further, the apparatus of installing the lens 12 of the rimless eyeglasses 10 and the connector 16 connected to the lug 18 to each other with the fastening tool 30 has been described in each of the above-described preferred embodiments. However, the present invention is also applicable to an apparatus for installing the lens 12 and the connector connected to the bridge of the rimless eyeglasses on each other.

It will be apparent from the foregoing that, while the present invention has been described in detail and illustrated, there are only particular illustrations and examples and the invention is not limited to these, the spirit and scope of the present invention is limited only by the appended claims.

What is claimed is:

1. A rimless eyeglasses lens-installing apparatus:
    a lens;
    a lens through-hole disposed in the vicinity of an edge of said lens and penetrating said lens in a direction from a side of one main surface thereof to a side of the other main surface thereof;
    a connector disposed on the side of said one main surface of said lens to connect said lens to one of a lug and a bridge;
    a connector through-hole communicating with said lens through-hole and penetrating said connector; and
    a fastening tool inserted into said lens through-hole in a direction from one of the side of said one main surface of said lens and the side of said other main surface thereof so as to mount said lens and said connector on each other;
    wherein said fastening tool is installed in said lens through-hole such that an end of said fastening tool does not project from said other main surface of said lens.

2. A rimless eyeglasses lens-installing apparatus according to claim 1, wherein said fastening tool includes:
    a first fastening member inserted into said lens through-hole in a direction from the side of said other main surface of said lens and fastened to said lens through-hole, and having an inner threaded portion; and
    a second fastening member having a threaded portion on a peripheral surface thereof and inserted into said first fastening member in a direction from the side of said one main surface of said lens such that said inner threaded portion of said first fastening member engages said threaded portion of said second fastening member to fasten said second fastening member to said first fastening member through said connector through-hole.

3. A rimless eyeglasses lens-installing apparatus according to claim 2, wherein said lens through-hole is unthreaded and defines a clearance hole;
    said first fastening member has a shaft portion having a bottomed hole, and a threaded portion disposed on an inner peripheral surface of said bottomed and hole and engaging said threaded portion of said second fastening member; and an inner diameter of said bottomed hole is smaller than a diameter of a peripheral portion of said second fastening member.

4. A rimless eyeglasses lens-installing apparatus according to claim 1, wherein said lens through-hole has a threaded portion on an inner peripheral surface thereof;

said fastening tool includes a first fastening member inserted into said lens through-hole in a direction from one of a side of one main surface of said lens and a side of the other main surface thereof and fastened to said lens through-hole, said first fastening member having an outer threaded portion to engage said threaded portion of said lens through-hole and an inner threaded portion, and a second fastening member having a threaded portion on a peripheral surface thereof and inserted into said first fastening member in a direction from the side of said one main surface of said lens such that said inner threaded portion of said first fastening member engages said threaded portion of said second fastening member to fasten said second fastening member to said first fastening member through said connector through-hole.

5. A rimless eyeglasses lens-installing apparatus according to claim 4, wherein said outer threaded portion of said first fastening member defines left-handed screw, said threaded portion of said lens through-hole engages said left-handed screw, and said inner threaded portion of said fist fastening member defines a right-handed screw.

6. A rimless eyeglasses lens-installing apparatus according to claim 4, wherein said first fastening member is installed in said lens through-hole such that an end of said first fastening member does not project from said other main surface of said lens.

7. A rimless eyeglasses lens-installing apparatus according to claim 5, wherein an adhesive agent is disposed on an engaging portion of said inner threaded portion of said first fastening member and an engaging portion of said threaded portion of said second fastening member.

8. A rimless eyeglasses lens-installing apparatus according to claim 5, wherein said first fastening member and said second fastening member are each made of a plastic material.

9. A rimless eyeglasses lens-installing apparatus according to claim 1, wherein said lens through-hole has a threaded portion on an inner peripheral surface thereof;

said fastening tool includes a first fastening member having an outer threaded portion and an insertion member having a threaded hole, said first fastening member is inserted into said lens through-hole in a direction from one of a side of the one main surface of said lens and a side of the other main surface thereof such that said outer threaded portion of said first fastening member engages said threaded portion of said lens through-hole so as to be fastened to said lens through-hole, and a second fastening member having a threaded portion on a peripheral surface thereof and inserted into said first fastening member in a direction from the side of said one main surface of said lens such that said threaded portion of said second fastening member is screwed into said threaded hole of said first fastening member to fasten said second fastening member to said first fastening member through said connector through-hole;

wherein each of said second fastening member and said insertion member is made of a metal material.

10. A rimless eyeglasses lens-installing apparatus:

a lens;

a lens through-hole disposed in the vicinity of an edge of said lens and penetrating said lens in a direction from a side of one main surface of said lens to a side of the other main surface thereof and having a threaded portion on an inner peripheral surface thereof;

a connector disposed on the side of said one main surface of said lens to connect said lens to one of a lug and a bridge; and a fastening tool inserted into said lens through-hole in a direction from one of the side of said one main surface of said lens and said other main surface thereof to mount said lens and said connector on each other;

wherein said fastening tool includes:

a first fastening member fastened to said lens through-hole and having an outer threaded portion engaging said threaded portion of said lens through-hole and an insertion member having a threaded hole; and a second fastening member that is integral with said connector and having a threaded portion on a peripheral surface thereof, the second fastening member is inserted into said first fastening member in a direction from the side of said one main surface of said lens such that said threaded portion of said second fastening member is screwed into said threaded hole of said first fastening member to fasten said second fastening member to said first fastening member; wherein each of said second fastening member and said insertion member is made of a metal material; and said first fastening member is installed in said lens through-hole such than an end of said first fastening member does not project from said one main surface of said lens and from said other main surface thereof.

11. A rimless eyeglasses len-installing apparatus according to claim 10, wherein said insertion member has a rotation/slip-off prevention portion including at least one of a slit, a concave portion, and a narrow concave portion that is disposed on a peripheral surface there of to allow said insertion member to be inserted firmly into said first fastening member.

* * * * *